United States Patent
Tan et al.

(10) Patent No.: US 11,118,615 B2
(45) Date of Patent: Sep. 14, 2021

(54) LOCKING CONNECTOR AND SHEET MATERIAL

(71) Applicant: HUNAN UNIVERSITY OF TECHNOLOGY, Zhuzhou (CN)

(72) Inventors: Yimin Tan, Zhuzhou (CN); Haiyun Jiang, Zhuzhou (CN); Wugang Hu, Zhuzhou (CN); Hongkai Deng, Zhuzhou (CN)

(73) Assignee: HUNAN UNIVERSITY OF TECHNOLOGY, Zhuzhou (CN)

( * ) Notice: Subject to any disclaimer, the term of this patent is extended or adjusted under 35 U.S.C. 154(b) by 0 days.

(21) Appl. No.: 16/459,806

(22) Filed: Jul. 2, 2019

(65) Prior Publication Data

US 2020/0318669 A1 Oct. 8, 2020

(30) Foreign Application Priority Data

Apr. 4, 2019 (CN) .......................... 201910269287.0

(51) Int. Cl.
*F16B 5/06* (2006.01)
*F16B 2/22* (2006.01)

(52) U.S. Cl.
CPC .............. *F16B 5/0607* (2013.01); *F16B 2/22* (2013.01)

(58) Field of Classification Search
CPC ........ E04F 15/02038; E04F 2201/0416; E04F 2201/0523; E04F 2201/05; E04F 15/02; F16B 2/22; E04D 5/142; E04D 5/143; E04D 5/145; E04D 5/146; E04B 1/38
See application file for complete search history.

(56) References Cited

U.S. PATENT DOCUMENTS

| | | | | |
|---|---|---|---|---|
| 4,534,145 A * | 8/1985 | Yang | ....................... | E04D 5/147 160/395 |
| 5,157,890 A * | 10/1992 | Jines | ....................... | E04B 5/02 52/476 |
| 6,339,908 B1 * | 1/2002 | Chuang | .................. | E04F 15/04 52/177 |
| 6,460,306 B1 * | 10/2002 | Nelson | .................. | E04F 15/04 52/570 |
| 7,614,197 B2 * | 11/2009 | Nelson | .................. | E04F 15/04 52/461 |
| 8,429,870 B2 * | 4/2013 | Chen | ...................... | E04F 15/02 52/582.1 |
| 9,464,443 B2 * | 10/2016 | Martensson | .......... | E04F 15/102 |
| 9,605,437 B2 * | 3/2017 | Cheng | ............... | E04F 15/02038 |
| 2002/0046527 A1 * | 4/2002 | Nelson | .................. | E04F 15/04 52/582.1 |

(Continued)

*Primary Examiner* — Beth A Stephan
(74) *Attorney, Agent, or Firm* — Resonance IP Law, PC

(57) ABSTRACT

Some embodiments of the disclosure provide a locking connector and a sheet material. According to an embodiment, the locking connector includes a locking base body. An annular protrusion is arranged at the middle portion of the locking base body while connecting protrusions are arranged on two sides. The two connecting protrusions are symmetrically located on two sides of the annular protrusion. A mounting groove is arranged between the connecting protrusion and the annular protrusion. The connecting protrusions, the mounting grooves, and the annular protrusion are used for clamping the sheet materials. The sheet materials are mounted, enclosed, and locked tightly in a plurality of directions.

7 Claims, 1 Drawing Sheet

(56) References Cited

U.S. PATENT DOCUMENTS

| | | | | |
|---|---|---|---|---|
| 2011/0030303 A1* | 2/2011 | Pervan | ............... | E04F 15/02 |
| | | | | 52/582.1 |
| 2014/0007525 A1* | 1/2014 | Wright | ............... | E04F 15/04 |
| | | | | 52/127.4 |
| 2015/0040508 A1* | 2/2015 | Zhang | ............ | E04F 15/02044 |
| | | | | 52/582.1 |
| 2019/0305715 A1* | 10/2019 | Gorny | ............... | B65D 57/00 |
| 2019/0368520 A1* | 12/2019 | Maxis | ............ | F16B 2/22 |

* cited by examiner

LOCKING CONNECTOR AND SHEET MATERIAL

CROSS REFERENCE TO RELATED APPLICATIONS

This application claims priority to Chinese application number. 20191026928-7.0 filed on Apr. 4, 2019, the disclosure of which is incorporated by reference herein in its entirety.

FIELD OF THE DISCLOSURE

The disclosure relates generally to the field of indoor decoration devices. More specifically, the disclosure relates to the field of a locking connector and a sheet material.

BACKGROUND

At present, most of the wood floors do not need to build the keel during pavement, and the traditional sheet material connection adopts a male/female groove interconnection manner, where 5-10% of the pavement area loss is caused by engagement superposition, so the rarer the wood is, the more remarkable the saving effect is. The traditional male/female groove is similar to a jigsaw form, and the formation of a protruding part need to cut off all of the peripheral wood, thereby causing serious waste. Furthermore, the wood floors can only be sequentially mounted during pavement by utilizing the traditional male/female groove interconnection manner, the wood floors must be engaged to be spliced one by one during mounting, and after a certain paved wood floor is broken, all of the paved wood floors need to be detached sequentially. Thus, the mounting speed is slow, and the replacement is complex and difficult.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a locking connector. The locking connector includes a locking base body. The locking base body is provided with an annular protrusion in the middle thereof and connecting protrusions on two sides thereof. The two connecting protrusions are symmetrically located on two sides of the annular protrusion. A mounting groove is arranged between the connecting protrusion and the annular protrusion. The connecting protrusions, the mounting grooves, and the annular protrusion are used for clamping sheet materials.

Optionally, the cross section of the lower end of the annular protrusion has an isosceles-trapezoid structure or a symmetric arc structure. The cross section of the upper end of the annular protrusion is elliptical. The annular protrusion is located between the two sheet materials.

Optionally, a center hole is opened in the upper end of the annular protrusion. The center hole can be used for inserting a pin.

Optionally, the cross section of the upper end of the connecting protrusion is elliptical.

Optionally, a buffering groove is arranged in the connecting protrusion. The buffering groove is used for matching with the sheet material.

Optionally, the annular protrusion is located higher than the connecting protrusion.

In further embodiments, the disclosure provides a sheet material. The sheet material includes a sheet body. First connecting recesses are arranged on four sides of the sheet body. The first connecting recess matches with the annular protrusion. A mounting surface is arranged on the sheet body. Second connecting recesses are arranged around the mounting surface. The second connecting recesses are arranged on the inner sides of the first connecting recesses in parallel. The second connecting recess matches with the connecting protrusion. A protruding edge is arranged between the first connecting recess and the second connecting recess. The protruding edge matches with the mounting groove.

Optionally, the lengths of the first connecting recesses and the lengths of the second connecting recesses are respectively equal to the four side lengths of the sheet body.

DETAILED DESCRIPTION

The following describes multiple exemplary embodiments of the disclosure with reference to the accompanying drawings. The described embodiments are merely a part rather than all of the embodiments of the disclosure. All other embodiments obtained by a person of ordinary skill in the art based on the embodiments of the disclosure without creative efforts shall fall within the protection scope of the disclosure.

Figure 1:
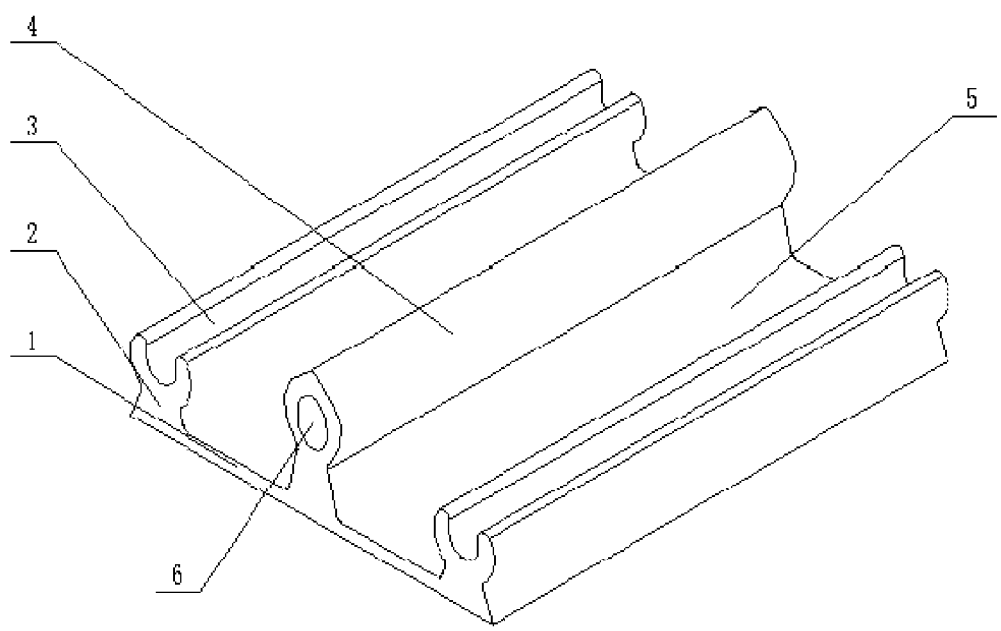
FIG. 1 is a schematic structural diagram of a locking connector.

As shown in FIG. 1, the disclosure provides a locking connector. The locking connector includes a locking base body 1. The locking base body 1 is provided with an annular protrusion in the middle thereof and connecting protrusions 2 on two sides thereof. The two connecting protrusions 2 are symmetrically located on two sides of the annular protrusion. The annular protrusion is located higher than the connecting protrusion 2, and the materials of the locking base body 1. The annular protrusion and the connecting protrusions 2 are polyolefin materials such as polyethylene, polypropylene and the like, polyester, ABS, nylon or other engineering plastics. A mounting groove 5 is arranged between the connecting protrusion 2 and the annular protrusion. The connecting protrusions 2, the mounting grooves 5, and the annular protrusion are all used for clamping sheet materials. The connecting protrusions 2 and the mounting grooves 5 are enclosed with the sheet materials in order that the adjacent sheet materials are connected tightly. Thus, if the same area of the sheet materials is paved by using the connector of the disclosure, the consumption of the sheet materials may be saved. The cross section of the lower end of the annular protrusion has an isosceles-trapezoid structure. The cross section of the upper end of the annular protrusion is elliptical or a symmetric arc structure. The annular protrusion is located between the two sheet materials. Thus, a resilience function of the annular protrusion is utilized to achieve a buffering function at a joint of the two adjacent sheet materials, and then extrusion friction generated when the sheet materials are stamped may be released, which may achieve an antifriction denoising effect. Furthermore, the annular protrusion may be extruded under stress to shrink towards the center in the sheet material pulling procedure in order to facilitate tripping of the sheet materials. The single sheet material may be vertically pulled out of the mounting groove 5 without damaging the connector or the other sheet materials, which may mitigate or avoid the necessity that that the sheet materials be sequentially detached in the traditional method and may thus improve the pavement and replacement efficiency.

Optionally, a center hole 6 is opened in the upper end of the annular protrusion. The center hole 6 may be used for inserting a pin so as to be capable of preventing spliced and paved sheet materials from releasing, which may meet various mounting decoration requirements such as suspending, hanging, and the like. The annular protrusion may shrink towards the center of the center hole 6 in the sheet material pulling procedure so as to facilitate the tripping of the sheet materials. The cross section of the upper end of the connecting protrusion 2 is elliptical, a buffering groove 3 is arranged in the connecting protrusion 2, and the buffering groove 3 is used for matching with the sheet material. By utilizing self-elastic deformation characteristic, the buffering grooves 3 on two sides may be fixedly connected with the sheet materials, and the buffering grooves 3 may shrink towards their centers in the sheet material pulling procedure which may facilitate the tripping of the sheet materials.

Figure 2:
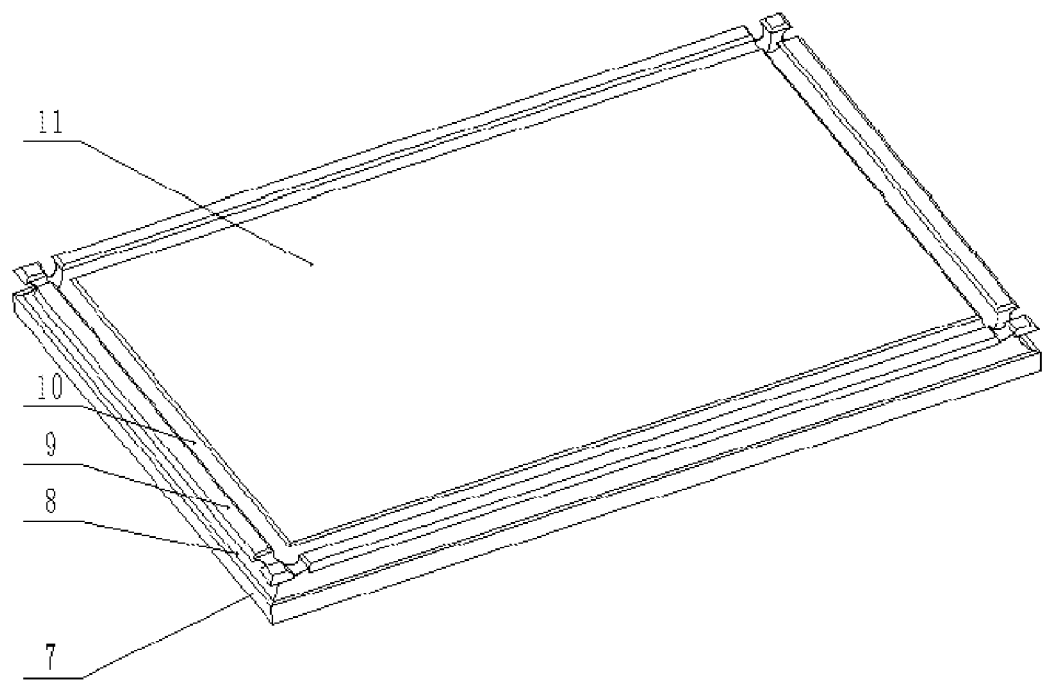
FIG. 2 is a schematic structural diagram of a sheet material.

As shown in FIG. 2, the disclosure further provides a sheet material. The sheet material includes a sheet body 7. First connecting recesses 8 are arranged on four sides of the sheet body 7. The first connecting recess 8 match with the annular protrusion. A mounting surface 11 is arranged on the sheet body 7. Second connecting recesses 10 are arranged around the mounting surface 11. The second connecting recess 10 is arranged on the inner side of the first connecting recess 8 in parallel. The second connecting recess 10 matches with the connecting protrusion 2. A protruding edge 9 is arranged between the first connecting recess 8 and the second connecting recess 10. The protruding edge 9 matches with the mounting groove 5. The lengths of the first connecting recesses 8 and the lengths of the second connecting recesses 10 are respectively equal to the four side lengths of the sheet body 7.

Based on the same principle of the snap fastener and the stud, the single sheet material fastens the connector by matching with the resilient deformability of the connector in the disclosure. The single sheet material may be randomly detached or mounted according to requirements without damaging any component. Furthermore, extrusion friction generated when the sheet materials are stamped may be released by utilizing the resilience and buffering functions of the connector of the disclosure, which may achieve an antifriction denoising effect. During pavement and use, the connector and a sheet material may be firstly extruded in order that the protruding edge 9 of the sheet material penetrate into the mounting groove 5, the buffering groove 3 matches with the second connecting recess 10 of the sheet material, and the clearance of the buffering groove 3 may be regulated in order to control the width of a space between two jointed sheet materials so as to adapt to shrinkage and expansion of the sheet material under difference temperature and humidity conditions. When the connector is connected with another sheet material, the two sheet materials may be tightly connected together according to the same operations. The degree of connection tightness of the two sheet materials is defined by the width and the position of the mounting groove 5. Alternatively, two sheet materials may be close together. The connector is directly pressed in to the first connecting recesses 8 and the second connecting recesses 10 of the sheet materials in a matching direction to form a tightly connected whole body. At the same time, synchronous pavement may be carried out on the four sides of the sheet material, which may improve the pavement efficiency.

Various embodiments of the disclosure may have one or more of the following effects. An annular protrusion may be arranged at the middle portion of a locking base body. Connecting protrusions may be arranged on two sides of the locking base body. The connecting protrusions on two sides and mounting grooves may be respectively locked and enclosed with a sheet material. The middle annular protrusion may tightly connect the two sheet materials, which may save the consumption of the sheet materials. The middle annular protrusion may further utilize its resilience function to achieve a buffering function at a joint of the adjacent sheet materials, which may damp and denoise. The middle annular protrusion may help to vertically pull out a single sheet material, which may improve the pavement and replacement efficiency. The middle annular protrusion may mitigate or avoid the necessity that the sheet materials be sequentially detached in the traditional method. The disclosure may provide a locking connector and a sheet material. The sheet materials may be mounted, enclosed, and locked tightly in a plurality of directions.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A locking connector comprising a locking base body, wherein:
   the locking base body has a flat bottom and further comprises an annular protrusion in a middle of the locking base body and two connecting protrusions on sides of the locking base body;
   the two connecting protrusions are symmetrically located on the sides of the annular protrusion, each connecting protrusion including a buffering groove arranged in the respective connecting protrusion; and
   a mounting groove is arranged between one of the connecting protrusions and the annular protrusion, wherein the connecting protrusions, mounting groove, and annular protrusion are configured to clamp sheet materials, and further wherein when each of the two buffering grooves are fixedly connected with the sheet materials, the two buffering grooves shrink towards their centers during a sheet materials pulling procedure.

2. The locking connector according to claim 1, wherein:
a cross section of a lower end of the annular protrusion has an isosceles-trapezoid structure or a symmetric arc structure;
a cross section of an upper end of the annular protrusion is elliptical; and
the annular protrusion is located between two sheet materials.

3. The locking connector according to claim 2, wherein:
a center hole extends in the upper end of the annular protrusion; and
the center hole is used for inserting a pin.

4. The locking connector according to claim 1, wherein:
a center hole extends in an upper end of the annular protrusion; and
the center hole is used for inserting a pin.

5. The locking connector according to claim 1, wherein a cross section of an upper end of the connecting protrusions is elliptical.

6. The locking connector according to claim 5, wherein:
the two buffering grooves are groove a used for matching with the sheet materials.

7. The locking connector according to claim 1, wherein a height of the annular protrusion from the locking base body is greater than a height of the connecting protrusions from the locking base body.

\* \* \* \* \*